United States Patent [19]

Kress et al.

[11] Patent Number: 4,601,630
[45] Date of Patent: * Jul. 22, 1986

[54] LOAD HANDLING APPARATUS

[75] Inventors: Edward S. Kress; Dennis R. Thomas; William L. LaBerdia, all of Brimfield, Ill.

[73] Assignee: Kress Corporation, Brimfield, Ill.

[*] Notice: The portion of the term of this patent subsequent to Dec. 18, 2001 has been disclaimed.

[21] Appl. No.: 645,910

[22] Filed: Aug. 29, 1984

Related U.S. Application Data

[63] Continuation-in-part of Ser. No. 428,751, Sep. 30, 1982, Pat. No. 4,488,848.

[51] Int. Cl.$^4$ .............................................. B60P 3/00
[52] U.S. Cl. .................................. 414/460; 294/81.61; 414/734; 414/917
[58] Field of Search ............... 414/458, 459, 460, 710, 414/712, 713, 738, 917; 212/147; 294/81.61; 414/734

[56] References Cited

U.S. PATENT DOCUMENTS

| | | | |
|---|---|---|---|
| 2,693,288 | 11/1954 | Black | 414/458 |
| 2,934,228 | 4/1960 | Hillberg | 414/458 |
| 2,959,310 | 11/1960 | Meister, Jr. | 414/459 |
| 3,387,726 | 6/1968 | McKee et al. | 414/458 |
| 3,494,492 | 2/1970 | Thiermann | 212/147 X |
| 3,759,185 | 9/1973 | Scherbatsky | 105/149 X |
| 3,876,093 | 4/1975 | Carriere | 414/738 X |
| 4,016,992 | 4/1977 | Larsen et al. | 414/740 |
| 4,020,960 | 5/1977 | Louis et al. | 414/458 |
| 4,170,434 | 10/1979 | Kress et al. | 414/459 |
| 4,384,817 | 5/1983 | Peterson | 414/563 |
| 4,427,334 | 1/1984 | Copie et al. | 414/710 |
| 4,488,848 | 12/1984 | Kress et al. | 414/460 |

FOREIGN PATENT DOCUMENTS 1406121 9/1975 United Kingdom ............... 414/459

OTHER PUBLICATIONS

Kress Corporation Information Sheet for a Slab Handling Vehicle (date unknown).
Kress Corporation Drawing No. PD696 Showing Tong Equipped Variation of U.S. Pat. No. 4,170,434.

Primary Examiner—Joseph E. Valenza
Assistant Examiner—Stuart J. Millman
Attorney, Agent, or Firm—Leydig, Voit & Mayer, Ltd.

[57] ABSTRACT

A load handling apparatus particularly suited for incorporation into a vehicle for lifting and transporting heavy loads such as steel billets, comprising a main frame to straddle a load, pivotally mounted lift frame assembly providing the lifting capability to raise a steel billet and suspend it during transport, suspended load engaging and clamping members, hydraulic cylinders to actuate the clamping and lifting members and an hydraulically actuated drag link for stabilizing the load while transporting over uneven terrain. The drag link is pivotally connected at its one end to the main frame and at its other end to the suspended load engaging and clamping assembly so that these pivot points, in conjunction with the pivot points of the lift frame assembly, substantially define a parallelogram relationship. By varying the length of the drag link, the clamping assembly is maintained in proper orientation relative to the ground. A hydraulic control system is provided for the cylinders associated with the lifting, clamping and load stabilizing members, each hydraulic circuit having independent control and overload protection mechanisms. In a preferred embodiment, the lateral clearance between the frame members and the clamping and lifting members is controlled to limit the deflection of the latter.

4 Claims, 7 Drawing Figures

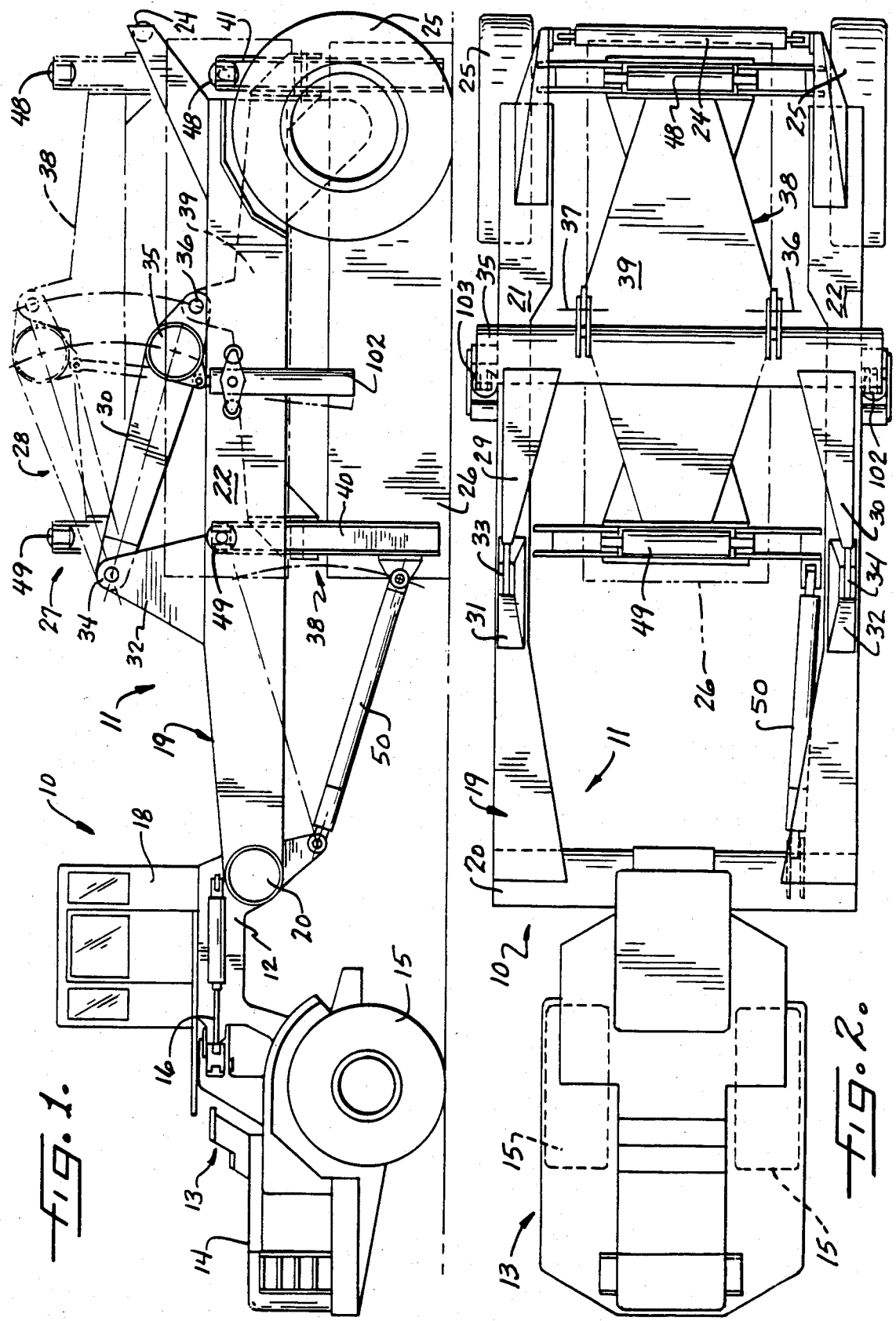

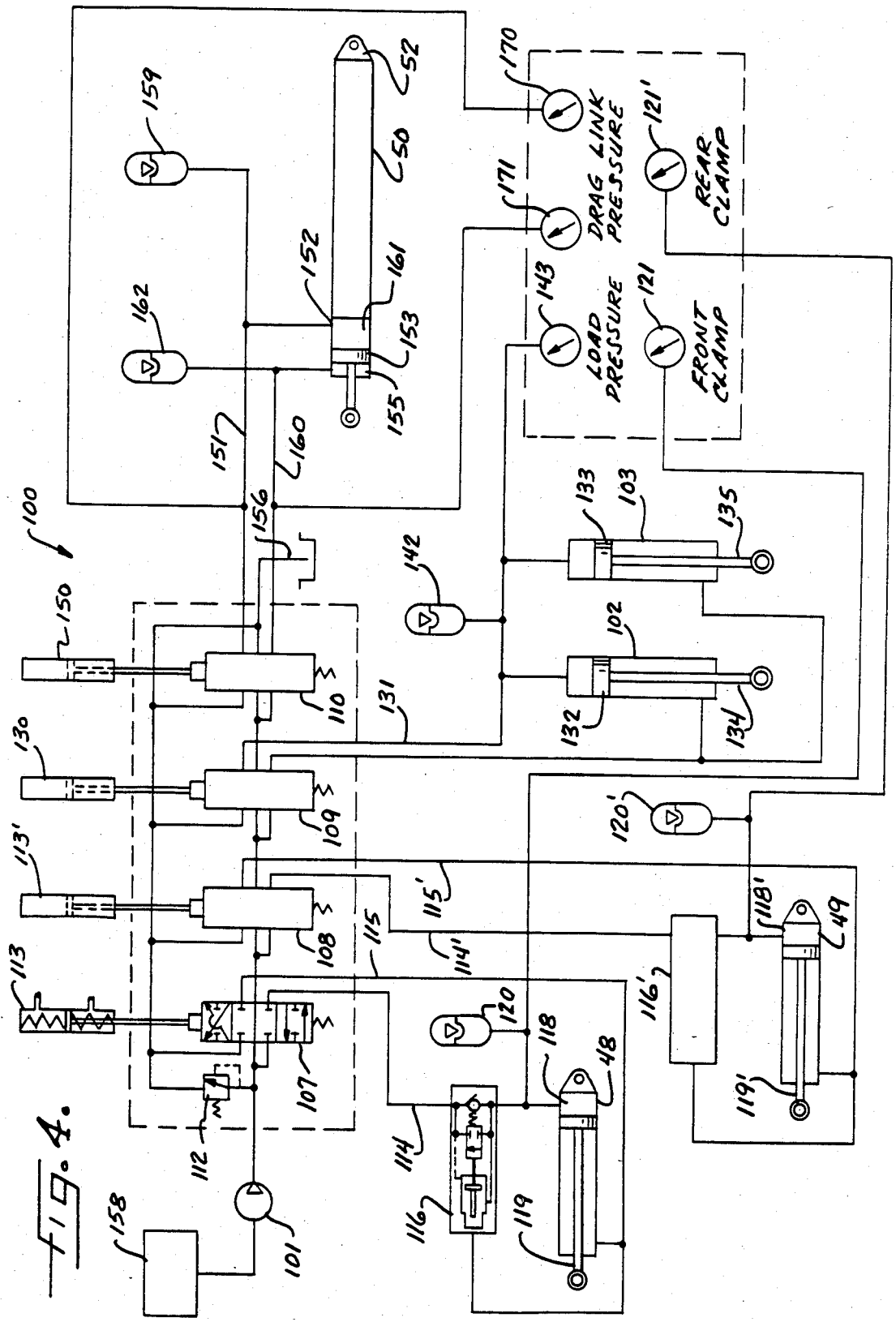

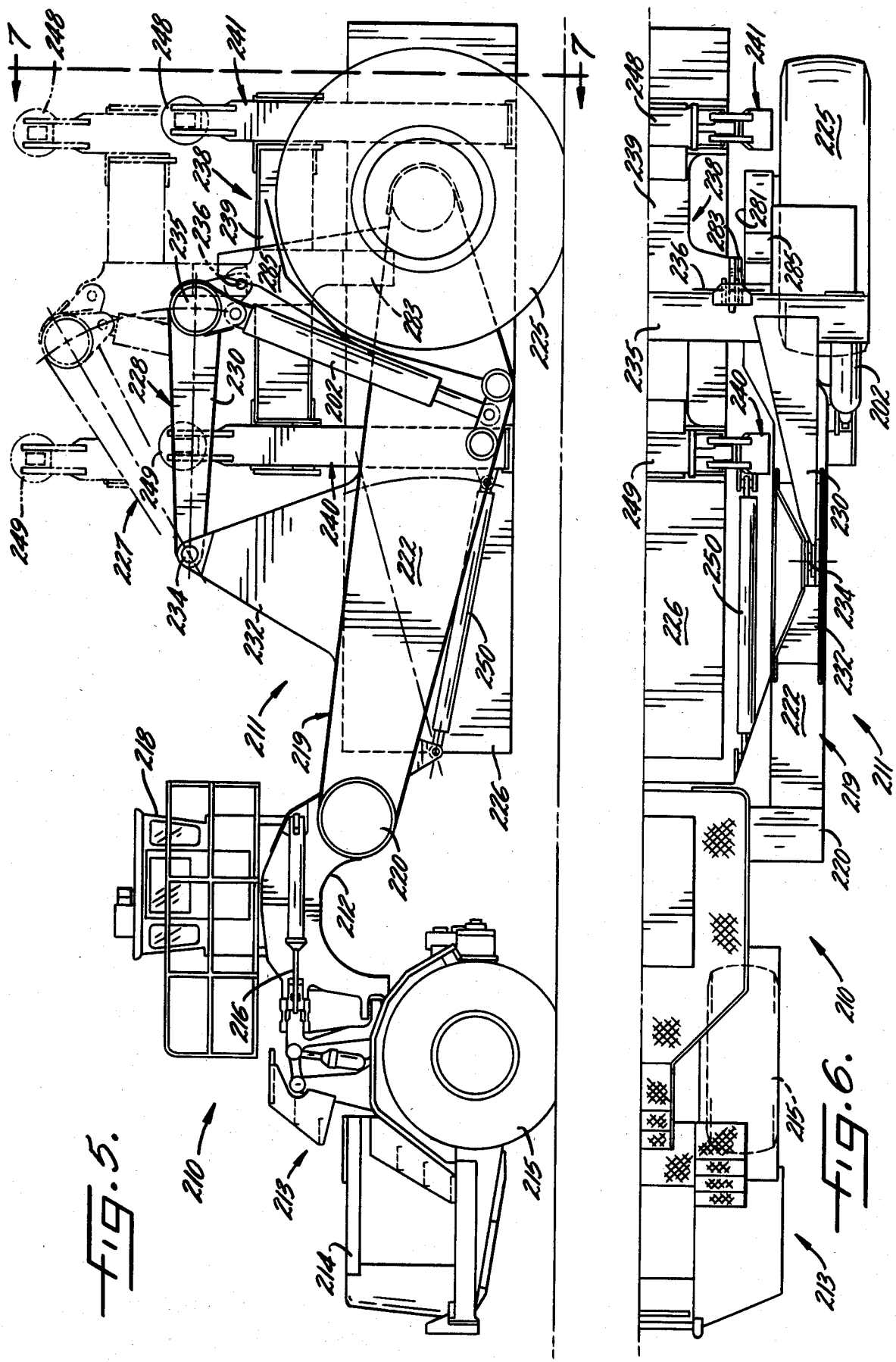

LOAD HANDLING APPARATUS

BRIEF SUMMARY OF THE INVENTION

This application is a continuation-in-part of U.S. application Ser. No. 428,751 filed Sept. 30, 1982, now U.S. Pat. No. 4,488,848.

The invention herein relates generally to mechanisms for handling heavy loads and, more particularly, concerns improvements in vehicles for picking-up, supporting, and carrying heavy loads.

U.S. Pat. No. 4,170,434 to Kress et al., entitled Load Handling Apparatus, and assigned to the assignee herein, discloses a vehicle designed for handling a load comprising steel slabs. Slab carriers of this type have proven to be dependable and efficient in operation.

A variation on the slab carrier disclosed in the '434 Kress et al. patent has also proven itself in the field. In that variation the principal changes involved the replacement of the links 31 and 32, the combination hook and clamp members 34 and 35, the drag links 38 and the actuating cylinders 44 and 45 with a side-clamping tong subassembly. The subassembly included a generally rectangular tong frame upon which two sets of tongs, one fore and one aft, were mounted, along with actuating cylinders for each set of tongs. The forward end of the tong frame was pivotally mounted directly to the forward lift frame 29, with the rear end of the tong frame being mounted to the rear lift frame 30 through links similar to but shorter than the links 32 shown in the '434 Kress et al. patent.

The present invention offers significant advantages over both the embodiment shown in the '434 Kress et al. patent and the variation thereon described above.

An object of the present invention is to provide an improved load handling apparatus employing tongs.

More specifically, an object of the present invention is to provide a load handling apparatus employing tongs which may be readily manipulated to compensate for uneven terrain.

Another object of the present invention is to provide a load handling apparatus employing tongs which may be controlled using relatively simple and reliable hydraulic circuitry.

BRIEF DESCRIPTION OF THE DRAWINGS

Other objects and advantages of the invention will become apparent upon reading the following detailed description and upon reference to the drawings in which:

FIG. 1 is a side elevation of a vehicle according to the present invention for carrying heavy loads such as slabs;

FIG. 2 is a plan view of the vehicle shown in FIG. 1;

FIG. 4 is a schematic of the pneumo-hydraulic control circuit for manipulating the tongs.

FIG. 5 is a side elevation of another embodiment of a vehicle according to the present invention for carrying heavy loads such as slabs;

FIG. 6 is a partial plan view of the vehicle shown in FIG. 5; and

Figure 3:
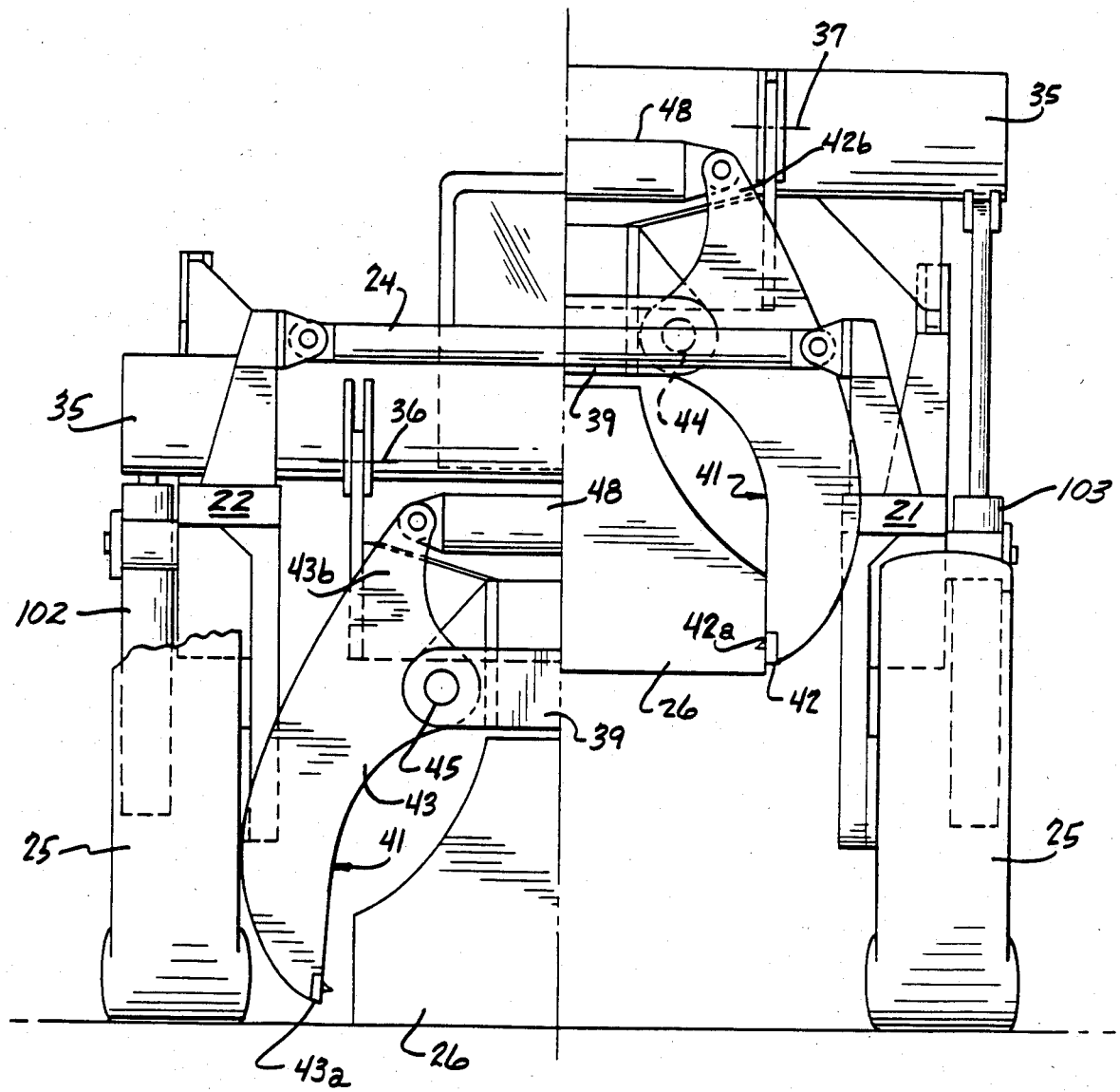
FIG. 3 is a rear elevational view of the vehicle illustrated in FIGS. 1 and 2 with the left half showing the tongs opened and lowered and straddling a load on the ground and the right half showing the tongs clamped against the load and raised.

While the invention is susceptible to various modifications and alternative forms, specific embodiments have been shown by way of example in the drawings and will hereinafter be described in detail. It should be understood, however, that it is not intended to limit the invention to the particular forms disclosed, but to the contrary, this invention is to cover all modifications, equivalents and alternatives falling within the spirit and scope of the invention as expressed in the appended claims.

DETAILED DESCRIPTION

Turning to FIGS. 1-3 there is shown a vehicle 10 embodying the invention consisting of a trailer 11 coupled through a gooseneck 12 to a single axle prime mover 13 having an engine 14 and drive wheels 15. A pair of steering actuators 16 connected between the gooseneck 12 and the prime mover 13 facilitate the swinging of the prime mover from side to side relative to the trailer 11, thus giving the assembly a steering capability. An operator's cab 18 is shown mounted to the gooseneck 12 of the trailer 11, though it will be appreciated that the cab can be relocated onto the tractor for height or other considerations.

The trailer 11 includes a rigid, generally straddle-type main frame 19 defined by a cross beam 20 and a pair of rearwardly extending box-type support beams 21 and 22 connected at their rear portions by a stabilization link 24. The rear wheels 25 are mounted one each to the rear of the box beams 21 and 22. The configuration of the main frame 19 is such that the trailer 11 may be backed over a load to be handled. For the purposes of illustration, the load is depicted as a steel billet 26 (shown in FIGS. 1-3).

According to one aspect of the present invention, the main frame 19 carries a single load lifting and carrying assembly 27. The function of this assembly is to raise or lower a straddled load and to grip the load while the vehicle is moving. As hereinafter described, the assembly 27 has the capacity of engaging the load and elevating it, lifting and carrying it either for a sorting and stacking operation or for maintaining ground clearance during a transporting operation. The load lifting and carrying assembly 27 includes a lift frame 28 pivotally mounted to the main frame 19. The lift frame 28 is comprised of longitudinally-extending arms 29 and 30 which are pivoted to supports 31 and 32, respectively, at transversely aligned points 33 and 34, while a cross beam 35 connects the free ends of the arms. With this configuration, the cross beam 35 of the lift frame 28 describes the path indicated by the dotted lines in FIG. 1. A mechanism for engaging and clamping the load is pivotally attached to the lift frame 28 at transversely aligned points 36 and 37. In the embodiment shown this engaging and clamping mechanism is shown as a tong subassembly 38.

The tong subassembly 38, as illustrated, includes a frame member 39 to which two sets of substantially identical tongs 40 and 41 are mounted. The rear set of tongs 41 is comprised of two members 42 and 43 pivoted in their central portions to the frame member 39 at pins 44 and 45, respectively. The lower ends 42a and 43a of the members are adapted to squeeze against and grip the load 26 when the upper ends 42b and 43b of the members are forced apart by the action of the rear tong assembly actuator, shown as an hydraulic cylinder 48. A counterpart cylinder 49 (shown in FIG. 2) operates the front tongs in the same manner. It will be appreciated that the specific configuration of the tong subassembly 38 can vary from that illustrated to suit a particular application depending upon the nature of the load, the size variations contemplated, the weight, etc.

Turning now to a consideration of the system for raising and lowering the lift frame 28, and, consequently, the tong subassembly 38, hydraulic actuators 102 and 103 are shown connected between the box beams 21 and 22, respectively, and the opposite ends of the cross beam 35 of the lift frame. In the embodiment shown the cylinders of the actuators are trunnion-mounted to the respective box beams, with the rods being pivotally mounted near the ends of the crossbeam 35. This arrangement permits, through the simultaneous extension or retraction of the hydraulic actuators 102 and 103, the pivoting of the lift arms 29 and 30 through the arc shown. It will be appreciated that the sizes of the actuators 102 and 103, as well as the specific points and methods of attachment to the main frame 19 and the lift arms 29 and can be varied to suit a particular application. The lifting and lowering sequence will be covered in more detail below.

According to an aspect of the present invention, a single drag link 50 is connected between the main frame 19 and the tong subassembly 38. The points of connection of this link 50 are chosen such that, when viewed in the side elevation, they, together with the pivot points 33 (and 34) and 36 (and 37), define substantially a parallelogram. With this arrangement, the tong subassembly 38, which would otherwise be free to pivot relative to the lift frame about the axis defined by the pivot points 36 and 37, is maintained in the same orientation relative to the main frame 19 regardless of the elevation of the lift frame 28.

It has been found that a single drag link 50 is not only sufficient to maintain the proper orientation of the tong subassembly 38, but it is also desirable from both an assembly and a control point of view since a single drag link avoids an unnecessary constraint which a second drag link would impose. This unnecessary constraint might manifest itself during assembly, when a single drag link can be readily assembled but a second one in a symmetric position on the opposite side might fail to align due to manufacturing tolerances and/or the warping of twisting of either or all of the main frame, the lift frame and the tong frame. Moreover, even after assembly any warping or twisting of any of the components, as when traveling on uneven terrain, might result in the placing of one of the links in tension and the other in compression, with an attendant stress on some or all of the several pivot points. A single link, on the other hand, minimizes such stresses.

According to a further aspect of the present invention, the drag link 50 may take the form of an hydraulic cylinder of the length of which is variable at least over a limited range. This arrangement is particularly advantageous in that it permits the link 50 to serve important additional functions beyond the maintenance of the tong subassembly 38 in a given orientation relative to the main frame as described above. One such advantage is the adjustment of the orientation of the tong subassembly 38 relative to the main frame 19 to facilitate operation under circumstances where the load to be picked up is not in the same horizontal plane as that of the vehicle, as could occur on uneven terrain. In such an instance the ability to adjust the length of the link 50, and, accordingly, the orientation of the tong subassembly 38 relative to the main frame 19, might be useful.

A variable length link 50 can also serve a shock-absorbing function when coupled with a pneumo-hydraulic accumulator in a circuit of the type shown in FIG. 4. With such an arrangement at least some of the impact loads generated by, for example, inadvertently backing one of the tong members into a stationary load, can be absorbed in the accumulator rather than being transmitted through the link to the frame. This feature will be discussed more fully below.

It will be appreciated that once a slab of steel has been lifted, the drag link cylinder can be adjusted to define the parallelogram shown in FIG. 1. Thereafter the drag link cylinder should seldom need adjustment to maintain the slab in its proper orientation relative to the ground regardless of the height to which the load is lifted. Few load orientation adjustments are contemplated in view of the fact that, by its nature, the parallelogram arrangement will automatically maintain the proper orientation.

The design according to the present invention may be controlled with a relatively simple and reliable control circuit, such as the one shown schematically as circuit 100 in FIG. 4. In general, the control circuit 100 contemplates manually operated pneumatic controls to selectively actuate the lift frame cylinders 102, 103, the rear tong assembly cylinder 48, the front tong assembly cylinder 49, and the drag link cylinder 50. Similar hydraulic components are described in detail in U.S. Pat. No. 4,170,434.

As shown in FIG. 4, hydraulic pump 101 delivers hydraulic fluid under pressure to four, three-position spool valves 107, 108, 109, and 110, which independently control the operation of the aforementioned actuating cylinders. A relief valve 112 located between the pump output and the spool valves 107, 108, 109 and 110 limits system pressure.

The three-position hydraulic spool valve 107, associated with rear tong assembly cylinder 48, is normally held in the off position shown via a double-acting spring-centered pneumatic feathering cylinder 113. A manually-operated pneumatic valve (not shown) may be selectively operated to provide pressurized air to one or the other of the feathering cylinder 113 ports, shifting the internal piston and, in turn, actuating the hydraulic spool valve 107. Pressurized hydraulic fluid from pump 101, which normally passes through valve 107 and is available to any of the successive valves 108–110 when the former is in a neutral condition, is routed through spool valve 107 to either line 114 or 115, depending on whether a clamping or unclamping action is desired from the corresponding tongs. When line 114 is pressurized, hydraulic fluid is supplied to pilot-actuated check valve assembly 116 (shown schematically) before entering cylinder 48. Pressurized fluid in line 114 can freely pass through the check valve assembly 116 into the chamber 118 of the cylinder, but can exit therefrom only when the pressure in line 115 exceeds that in line 114 by a predetermined minimum. This feature assures against inadvertent unclamping of the load, as might otherwise occur when spool valve 107 is returned to its neutral position or in the event of a hydraulic failure upstream of the check valve 116.

The flow of pressurized hydraulic fluid into chamber 118 of hydraulic cylinder 48 forces actuator arm 119 to the left in FIG. 4, which in turn causes a clamping action of the rear tongs 41 (see FIG. 1). After the load has been clamped, absent pressure in line 115, the fluid within the chamber 118 will maintain the actuator arm 119 extended. An pneumo-hydraulic accumulator 120 is incorporated between the check valve assembly 116 and the cylinder 48 to serve a shock-absorbing function and to provide a pressurized source of hydraulic fluid to maintain pressure in chamber 118. A pressure gauge 121 in the operator's cab may be employed to provide a visual indication of the clamping pressure.

The hydraulic circuitry associated with and the operation of front clamp cylinder 49 are identical to those of rear clamp cylinder 48. Corresponding components in FIG. 4 have been assigned similar numbers, e.g., feathering cylinder 113' corresponds to item 113.

In the control circuit 100 shown, the lift cylinders 102, 103 are controlled with a single, manually operated pneumatic valve (not shown) which controls a feathering cylinder 130 which, in turn, activates the hydraulic spool valve 109. For the lifting operation, line 131 is charged with hydraulic fluid routed through valve 109 and directly into lift cylinders 102, 103. Hydraulic fluid pressure acting on pistons 132, 133 causes the simultaneous extension of actuator arms 134, 135 (see FIG. 1).

It will be appreciated that such a parallel arrangement of the lift cylinders 102 and 103 might, in the case of a load which is not evenly distributed from side-to-side, result in a somewhat uneven extension of the actuators 134 and 135. This may be readily accommodated by constructing the lift frame to permit a limited amount of twisting. Inasmuch as the cylinders 102 and 103 are interconnected, their retraction under the weight of the load, whether intentional or the result of an unexpected hydraulic failure, will be substantially simultaneous. A pneumo-hydraulic accumulator 142 similar to the accumulator 120 gives a shock-absorbing function, as when the vehicle is carrying a load over rough or uneven terrain. A pressure gauge 143 in the operator's cab may be provided to indicate the pressure in the lift cylinders, providing an indication of the magnitude of the load.

The operation of the adjustable drag link 50 according to the invention will now be described. As with the control of the clamping and lift cylinders, a manually operated pneumatic valve (not shown) provides pressurized air to feathering cylinder 150 to selectively actuate the hydraulic spool valve 110. To increase the length of drag link 50, line 151 is pressurized with hydraulic fluid which is routed through valve 110. Hydraulic fluid enters drag link 50 at port 152 and acts on piston 153 to move it leftward in FIG. 4. Hydraulic fluid forced out of chamber 155 when piston 153 moves leftward returns through spool valve 110 and to the fluid return line 156 of hydraulic reservoir 158. A pneumo-hydraulic accumulator 159 is associated with line 151 to absorb any surges in hydraulic fluid pressure due to inadvertent impacts on the tong assembly 38 being transmitted as a compressive force on drag link 50.

In a similar manner, the length of the drag link 50 may be shortened by activating the spool valve 110 to pressurize line 160. As hydraulic fluid under pressure fills chamber 155, the piston 153 moves rightward and forces any fluid in chamber 161 to return through line 151, through spool valve 110, and eventually to reservoir 158. A pneumo-hydraulic accumulator 162 is associated with line 159 to absorb impacts which are transmitted to the drag link 50 as tensile forces.

In keeping with another aspect of the present invention, pressure gauges 170 and 171 may be located in the operator's cab for visual indication of the hydraulic pressure in lines 151 and 160, respectively. Since the purpose of the drag link is simply to maintain the tong subassembly and any load in the position they tend to assume by gravity, under ideal conditions it should be neither in tension nor compression. Under such circumstances, the pressure reading on gages 170 and 171 should be substantially equal, near zero. If, however, the pressure readings on gages 170 and 171 are significantly different, it is an indication that the load may be improperly balanced fore to aft and should be adjusted.

Figure 7:
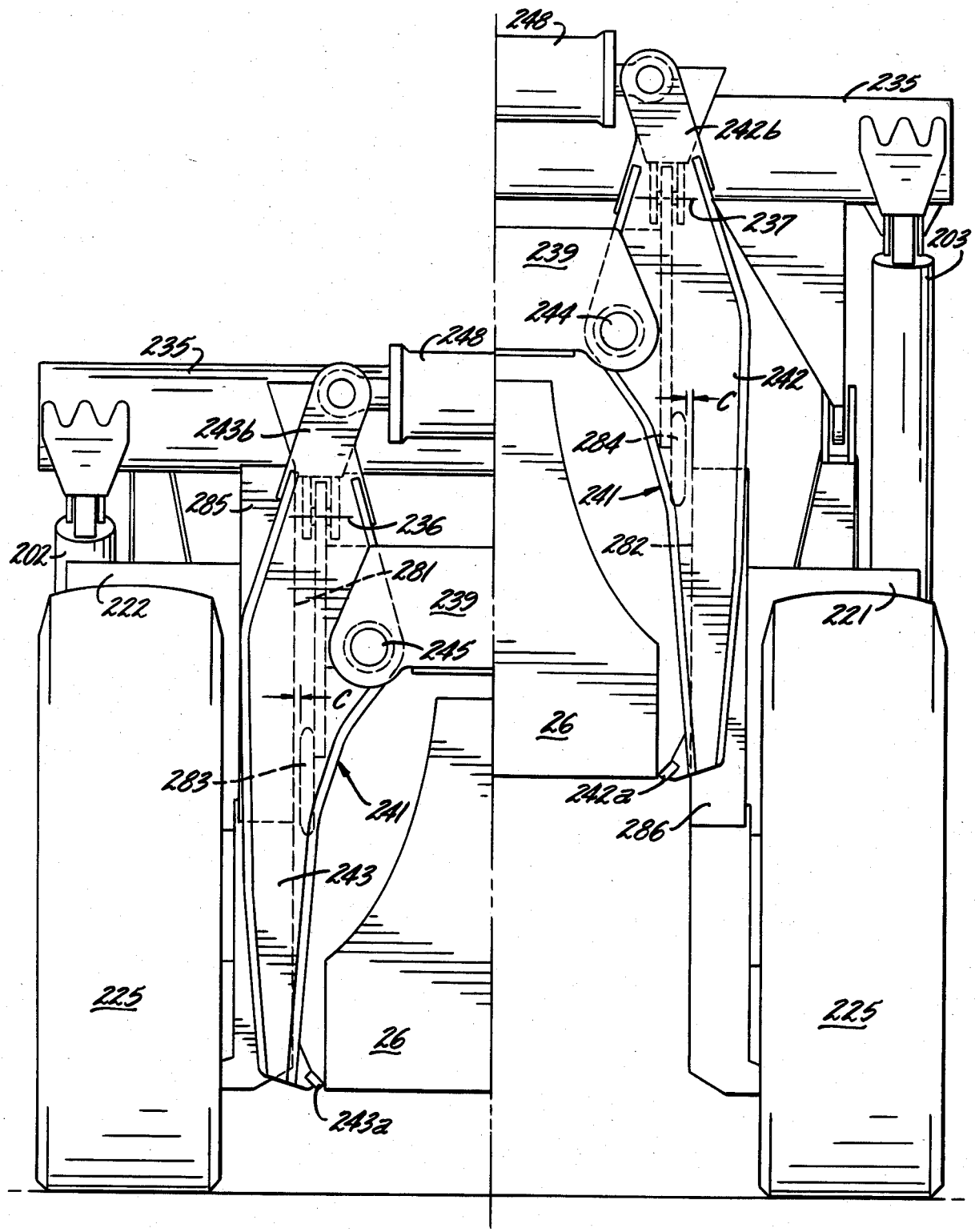
FIG. 7 is a rear elevational view taken of the vehicle illustrated in FIGS. 5 and 6. It is similar to FIG. 3 in that the left half illustrates the lifting assembly in the lowered position while the right half illustrates the lifting assembly in the fully raised position.

A second embodiment of the invention is illustrated in FIGS. 5-7. The vehicle is generally similar to that shown in FIGS. 1-3, except it is designed for much higher loads and incorporates additional features of the invention. The FIG. 4 control circuit is equally applicable to the FIGS. 5-7 embodiment. Aspects of the FIGS. 5-7 embodiment which are functionally equivalent to aspects of the FIGS. 1-3 embodiment will not be described again. In instances where such equivalence exists, the second and third digits of the 200-series item numbers correspond to those of counterpart items in FIGS. 1-3.

An important aspect of the invention as embodied in the FIGS. 5-7 design relates to the lateral stabilization of the load lifting and carrying assembly 227. This assembly includes the lift frame 228 and the tong subassembly 238 suspended from the lift frame at pivot points 236 and 237. The embodiment shown in FIGS. 5-7 is designed for payloads of up to 150 tons. Other designs for even higher payloads are contemplated. With payloads of this magnitude, the U-shaped lift frame 228, consisting of longitudinally-extending arms (only one of which, arm 230, is shown in FIG. 6) and the cross beam 235 whose opposing ends connect to the arms, might tend to deform and deflect laterally under the tremendous loads borne by the tongs. Not only is the weight of the loaded tongs significant, but the additional inertial forces resulting from turns and rough terrain can be very high. Such unrestrained lateral movement of the lifting assembly relative to the remainder of the carrier might give rise to a variety of detrimental stresses, including stresses within the arms at their points of attachment to the cross beam 235.

According to an aspect of the present invention, the lateral deflection of the lifting assembly relative to the remainder of the carrier may be avoided by minimizing the spacing between the vehicle frame and the lifting assembly. To this end, in the FIGS. 5-7 embodiment interacting surfaces are provided on the tong subassembly 238 and the adjacent frame members 221 and 222 to result in a controlled, minimal amount of clearance between the tong assembly and the frame. The manner in which this is accomplished in the embodiment shown prevents excessive lateral deflection without in any way inhibiting the overall versatility of the carrier.

The interaction of the surfaces and the elements carrying them are best seen in FIGS. 6 and 7. The split view of FIG. 7, the left half showing the lifting assembly in its lowered position and the right half showing the lifting assembly in the raised position, illustrates substantially vertical slide plates surfaces 281 and 282 spaced somewhat further apart than the distance between pads 283 and 284 carried by the tong subassembly 238.

It will be appreciated that the slide surfaces of 281 and 282 must have a vertical height sufficient to interact with the pads 283 and 284 over their entire range of travel, which corresponds to the lifting range of the entire lift assembly. Inasmuch as the areas of the tong frame 239 to which the pads 283 and 284 are attached rises above the frame members 221 and 222 with the tongs 238 in the fully lifted position in the embodiment shown, of the upper portions of slide surfaces 281 and 282 may be reinforced by vertical frame extensions 285 and 286, as shown. It has been found that, for a carrier of the size shown in FIGS. 5–7 (about 50 feet overall length), a clearance C of about an inch on each side provides the necessary stability without binding or interference between the interacting slide surfaces and the pads.

We claim as our invention:

1. A load handling apparatus comprising, in combination, a main frame having a pair of main support beams arranged substantially parallel and spaced apart from one another by an amount sufficient to straddle the load to be handled;

a lift frame spanning the space between the main support beams, the lift frame having two side members and a single cross member, each side member being pivotally mounted at one end to the main support beams at a first set of transversely aligned pivot points, and each said side member being rigidly connected at the other end to the cross member, the lift frame being movable between a lowered position in which portions of the lift frame including the cross member may rest on the main support beams and a raised position in which the portions of the lift frame are pivoted up and away from the main support beams, the difference in elevation of the lift frame portions relative to the main frame between raised and lowered positions providing the lifting capability of the lift frame;

a tong subassembly supported from the cross member at a second set of transversely aligned pivot points, the second set of pivot points being longitudinally spaced from the first set of pivot points;

means for actuating said lift frame to raise and lower the tong subassembly relative to the main frame;

means for actuating the tong subassembly for clamping onto the load; and a load stabilizing link, the opposite ends of the link being pivotally connected between the main frame and the tong subassembly at longitudinally spaced pivot points, the first and second sets of pivot points and the pivot points of the ends of the load stabilizing link forming substantially a parallelogram when viewed from the side whereby the tong subassembly mechanism is maintained in substantially the same orientation relative to the ground as the lift frame is raised and lowered; and means for limiting lateral movement of the lift frame and tong subassembly relative to the main frame.

2. The load handling apparatus as set forth in claim 1, the means for limiting lateral movement comprising a pair of slide surfaces, each mounted to one of said main support beams and a pair of slide members carried by said tong subassembly, each of said slide members opposing one of said slide surfaces, the slide surfaces having sufficient vertical height to permit them to interact with the slide surfaces throughout the entire lift range of the tong subassembly, the slide surfaces providing lateral load-bearing support to said tong subassembly through said slide members when the tong assembly tends to shift laterally by more than a predetermined maximum amount.

3. The load handling apparatus as set forth in claim 1 wherein the length of load stabilizing link is adjustable.

4. The load handling apparatus as set forth in claim 3 wherein the load stabilizing link comprises a double acting hydraulic cylinder, one end being pivotally mounted on the tong subassembly.

* * * * *